(12) United States Patent
Smith et al.

(10) Patent No.: US 6,281,806 B1
(45) Date of Patent: Aug. 28, 2001

(54) DRIVER ROAD HAZARD WARNING AND ILLUMINATION SYSTEM

(75) Inventors: Gregory Hugh Smith, Ann Arbor; Samuel Edward Ebenstein; Yelena Mordechai Rodin, both of Southfield, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/689,411

(22) Filed: Oct. 12, 2000

(51) Int. Cl.⁷ .................................................. G08G 1/00
(52) U.S. Cl. .......................... 340/901; 340/436; 340/468; 340/903
(58) Field of Search ...................... 340/901, 435, 340/438, 436, 540, 541, 545.2, 545.3, 903, 468, 425.5, 471; 180/271, 274; 307/9.1, 10.1

(56) References Cited

U.S. PATENT DOCUMENTS

| | | |
|---|---|---|
| 5,410,346 | 4/1995 | Saneyoshi et al. . |
| 5,418,518 * | 5/1995 | Schenken et al. ................ 340/384.1 |
| 5,448,233 | 9/1995 | Saban et al. . |
| 5,617,085 * | 4/1997 | Tsutsumi et al. ..................... 340/903 |
| 5,627,510 * | 5/1997 | Yuan ..................... 340/435 |
| 5,627,518 * | 5/1997 | Wishart ................ 340/567 |
| 5,939,987 * | 8/1999 | Cram ................................. 340/573.2 |
| 5,949,331 | 9/1999 | Schofield et al. . |
| 5,963,148 | 10/1999 | Sekine et al. . |
| 5,983,161 | 11/1999 | Lemelson et al. . |

\* cited by examiner

Primary Examiner—Jeffery Hofsass
Assistant Examiner—Toan Pham
(74) Attorney, Agent, or Firm—Jennifer M. Stec; William J. Coughlin

(57) ABSTRACT

A vision enhancement system 10 which aids the driver in visually identifying a sensed object 16 without diverting his/her attention from the road ahead. One or more sensors 20 used to collect information about the vehicle's environment are operatively coupled with a controlled source of illumination 38. A processor 24 receives input from the sensors and intelligently determines whether a particular object sensed in or near the current path of the vehicle requires alerting the driver. If so, the processor outputs a control signal 30 to effect illumination of the sensed object. The source of illumination is controlled so as to continuously direct light onto the identified object, even as the vehicle and/or object move simultaneously with respect to one another.

13 Claims, 1 Drawing Sheet

DRIVER ROAD HAZARD WARNING AND ILLUMINATION SYSTEM

FIELD OF THE INVENTION

The present invention relates generally to vehicle situational awareness systems, and more particularly, to a vehicular driver vision enhancement system which monitors the environment surrounding a vehicle, and upon detecting an object potentially in the path of the vehicle, illuminates the object to provide enhanced visibility for the driver.

BACKGROUND AND SUMMARY OF THE INVENTION

Automotive companies and their suppliers are working hard to rapidly develop and implement vehicle situational awareness systems designed to technologically assist a driver in discerning and effectively reacting to objects in the environment around a vehicle. Examples of such systems include forward collision warning systems, backup parking aids and driver vision enhancement.

Driver vision enhancement systems, in particular, are intended to assist a driver operating a vehicle in conditions of less than optimal visibility, such as darkness, heavy rain or fog. These systems generally operate by monitoring the area immediately surrounding the vehicle and providing the driver with advanced notice of any object which is sensed by the system and determined to have the potential for intersecting the path in which the vehicle is traveling. This advanced notice is intended to compensate for a driver's reduced ability to visually make the same determination, thereby providing the driver with additional time to react to a potential obstacle.

U.S. Pat. No. 5,963,148, for example, discloses a system which utilizes a video camera in combination with a temperature sensor (in the form of an infrared camera) to identify objects in or on the road ahead of the vehicle, such as a pedestrian, animal or even ice. The driver is warned of the presence of a sensed object or condition by an audible alarm or by a visual display inside the vehicle. Saneyoshi (U.S. Pat. No. 5,410,346) similarly utilizes stereo cameras to detect objects in the roadway ahead of the vehicle and provide an advanced warning signal to the driver.

While such systems may prove effective in sensing and alerting the driver to a potential obstacle or hazard, these systems are disadvantageous in that they nonetheless require that the driver ultimately be able to visually locate and identify the object giving rise to the warning. In so doing, the driver is still required to make a decision based on visual information which remains hindered by adverse conditions.

Where these systems have attempted to aid the driver in visually locating the sensed object, such as through a pictorial or graphical display on a screen inside the vehicle, they are disadvantageous in that the driver's attention is diverted from the road ahead to a small display screen inside the vehicle. Valuable reaction time is consumed by the task of translating the orientation of the object shown in the display into the real world environment that the driver sees through the windshield. Furthermore, in instances of a falsely triggered warning, or where the source of the warning no longer presents a potential problem (a deer in the roadway which subsequently retreats into the woods, for example), the driver may be caused to take his/her eyes off the road unnecessarily.

The present invention overcomes these disadvantages and provides a vision enhancement system which aids the driver in visually identifying a sensed object without diverting his/her attention from the road ahead. This is accomplished by providing a means to illuminate the sensed object itself so as to enhance its visibility to the driver and not unduly divert his/her attention from the road. In addition, not only are any difficulties inherent in translating location information from a display screen to the real world eliminated, the total amount of time that the driver has to react to the sensed object is increased.

This is accomplished by operatively coupling one or more sensors used to collect information about the vehicle's environment with a controlled source of illumination. A processor receives input from the sensors and intelligently determines whether a particular object sensed in or near the current path of the vehicle requires alerting the driver. If so, the processor outputs a control signal to effect illumination of the sensed object. The source of illumination is controlled so as to direct light onto the identified object even as the vehicle and/or object move simultaneously with respect to one another.

Other advantages and features of the present invention will become apparent when viewed in light of the description below, taken in conjunction with the attached drawings and appended claims.

DESCRIPTION OF THE PREFERRED EMBODIMENTS

Figure 1:
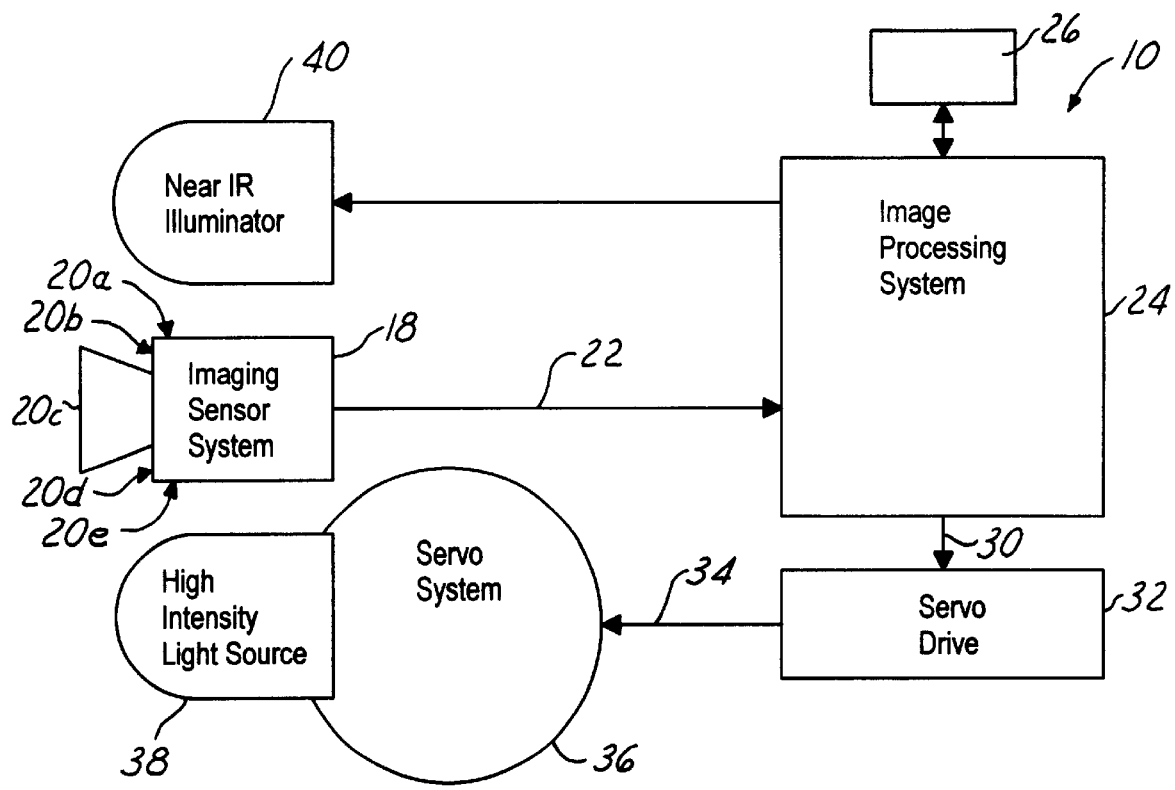
FIG. 1 is a block diagram of the system of the present invention.
Figure 2:
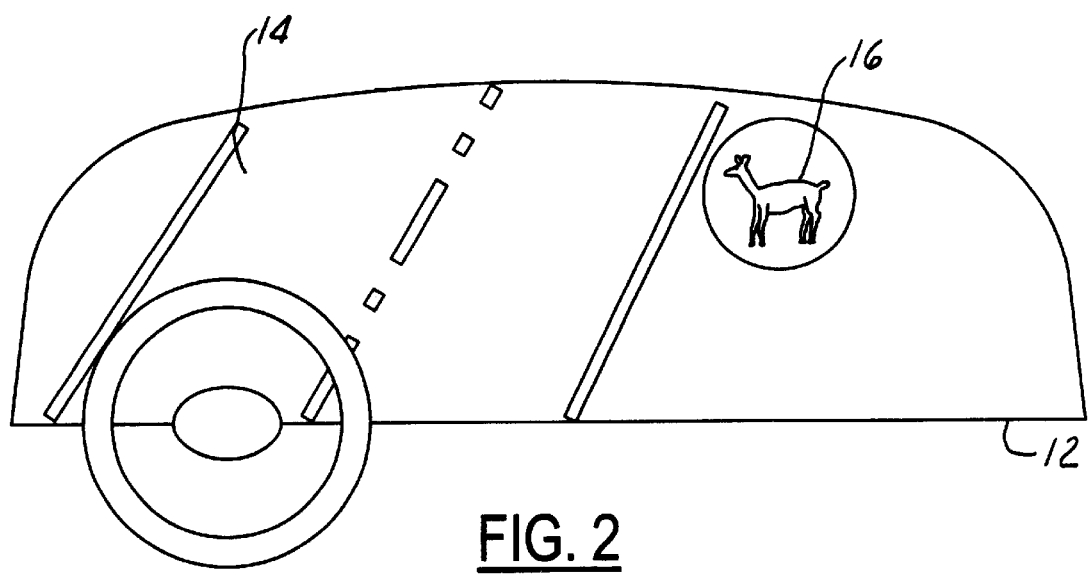
FIG. 2 is a pictorial illustration depicting the operation of the present system.

Referring to the drawings, a driver warning and object illumination system of the present invention is indicated generally at 10. System 10 is installed in a vehicle 12 which travels along a path or roadway 14 in the general direction of one or more objects 16. While an exemplary embodiment is described herein, it will become readily apparent to one of skill in the art that system 10 can be configured and operated in many different ways to provide a wide range of functionality.

System 10 includes an image sensing system 18 having one or more sensors 20 which collect information about the environment in which vehicle 12 travels. While image sensing system 18 could include only a single sensor, a preferred embodiment includes a plurality of sensors 20a, 20b, 20c, 20d, 20e whose respective outputs can be collectively utilized by sensor system 18 to provide comprehensive information relative to the immediate surroundings of vehicle 12.

Any of sensors 20 may be sensitive to visible light, near infrared (IR), far infrared or utilize radar or any other technology suited to a given application. All of sensors 20 may be of the same type or sensors of various types may be used in order to optimize the information obtained. Sensors 20 are mounted to the vehicle and may be aimed directly ahead of the vehicle, to the side or rear, or even downwardly onto the surface of the road. In this exemplary embodiment, the fields of interest of sensors 20a, 20b, 20c, 20d, 20e collectively cover the area in front of the vehicle, to the sides, to the rear and downwardly onto the road surface ahead of the vehicle as well as to the side.

Suitable control means may be provided in image sensing system 10 to cause any one or more of the sensors 20 to be enabled or disabled, or even redirected, depending upon the current desired functionality of the system. This control may be effected by driver input, such as through providing the driver with a number of modes of operation from which to select, or automatically through a separate control means. One of sensors 20 may be a brightness or other similar sensor suitable for providing an indication of current visual conditions and to thereby automatically turn system 10 on or off. The sensors aimed in the direction of vehicle travel may be controlled to cover relatively short or long distances, depending upon the desired operation of the system, and may be adapted to identify the presence of any oncoming traffic for purposes to be described in more detail below.

Imaging sensor system 18 produces a plurality of output signals 22 which are input into an image processing system 24. Output signals 22, as well as any other signals described herein may be transmitted directly over dedicated hardwire, may be transmitted utilizing a suitable wireless technology such as bluetooth, and/or may be transferred via the vehicle's communication bus structure over which various vehicular electronic components communicate with each other.

In a preferred embodiment, at least some of the signals 22 output by sensor system 18 include pixel data, such as obtained by a metal oxide semiconductor (CMOS) camera or charge coupled device (CCD). Image processing system 24 is preferably a real time image video processor, such as that being developed at Sarnoff Research Laboratories. This processor operates at frame rates of about 30 frames/second and processes images with a time lag of less than 0.1 second. System 24 preferably processes image information collected from several sensors 20 so as to provide an integrated view of the vehicle's surroundings. In this regard, system 24 could also process range data, such as collected by a suitable range finding sensor such as radar signal or computed from image data utilizing a triangulation or other suitable technique. The system may also be configured to recognize and distinguish between certain defined objects such as the colored lines painted on roads to delineate lanes of traffic. System 24 also preferably runs image processing algorithms enabling the identification of changes in the road surface such as pot holes, standing water and other irregularities. These identifications, as well as all other determinations made by image processing system 24 described herein, are preferably carried out using any suitable image processing technique well known to those of skill in the art.

Optionally, image processing system 24 may be further electronically coupled to one or more other vehicle systems 26, such as a telematic controller, automatic cruise control system or other vehicle controller so as to enable additional system functionality as described in more detail herein below. The communication between the individual components of system 10, as well as with other vehicle systems 26, may take place over any suitable wired or wireless communication media. Image processing system 24 may operate alone, or in cooperation with one or more of these other systems to process the output data of sensing system 18 and identify and/or classify sensed objects or conditions and intelligently determine whether it is appropriate to notify the driver. To accomplish these tasks, image processing system is programmed with a series of control algorithms created to carry out the desired functionality of the system.

Image processing system 24 preferably is able to discriminate between people, animals, moving or stationary objects, and can use this information to vary its output based on the type of object identified, or the rate at which it may be approaching the path of the vehicle or the vehicle itself. These determinations can be made with a combination of image processing of the sensor data collected, with other data obtained from vehicle systems 26 such as speed information from an engine control module or vehicle route (path) information from a navigation system.

Once image processing system 24 determines that the driver should be alerted, processor 24 outputs a plurality of control signals 30 to a servo drive system 32 which in turn provides control signals 34 to a servo motor system 36 used to appropriately position at least one high intensity light source 38. Because both the obstacle and the vehicle may be moving simultaneously in different directions, light source 38 must be moved very quickly to remain aimed at object 16. To accomplish this, light source 38 is preferably very lightweight, or otherwise includes a means of directing its light output. A number of methods known to those having skill in the art exist to perform this function, in a manner similar to that used to effect target following functions in military applications.

In one preferred embodiment, light source 38 is a fiber optic source having a light generation system which can remain mounted in a fixed position in the vehicle and a small, lightweight light directing component movable via servo system 36. Alternatively, light source 38 could be made up of a lens and mirror combination which directs light in a manner similar to a galvanometer.

As alluded to above, system 10 preferably works cooperatively with many other vehicular systems. For instance, when connected to the vehicle's telematic control unit, system 10 gains the ability to be operated as well as reprogrammed from a remote location such as a telematic call center. Global Positioning System (gps) data gained through the vehicle's telematic system, or through a separate gps or navigation system, can be used to add intelligence to the control algorithms and enable consideration things like the shape of the roadway ahead of the vehicle or the route on which the vehicle is traveling.

Connection to an adaptive cruise control system or to another speed control system can be used to effect control of one or more vehicular systems based upon the output of system 10. For instance, where an object is identified directly in the path of the vehicle, the vehicle can be automatically slowed or the brakes applied. Preferably a number of thresholds would be applied in order to restrict such vehicle control actions to very limited circumstances. These could include where the identified object exceeds a certain size or is calculated using range information to be approaching very rapidly.

The connection to various other vehicular systems may also enable system 10 to perform more intelligently. For example, where system 10 is configured to receive and take into consideration information indicative of the vehicle brakes being applied, the control algorithms of image processing system 24 can operate to disable illumination of a sensed object if a certain minimum pressure has been very recently applied to the brakes.

The system 10 may also be controlled so as to take into consideration the presence of oncoming traffic. For instance the brightness of light emitted by light source 38 may be lower when oncoming traffic is present and/or the precise angle at which the light is aimed by servo system 36 may be adjusted slightly to minimize the distraction to drivers of oncoming vehicles or to avoid unnecessarily interfering with another driver's vision.

The illumination produced by system 10 may be accompanied by an audible or other warning, either by a separate device, or operating through the vehicle's speaker system. This audible signal may be used to alert the driver and enable him/her to control the system (such as through pressing a button or voice control) to stop the system from illuminating a sensed object that the driver already sees.

The capability to distinguish bright colors would enable the system to be configured so as to intelligently determine whether the vehicle was crossing a lane marker line improperly, such as entering into an oncoming lane of traffic or departing across a solid line from the roadway. In this instance, the illumination provided by system 10 would be directed downwardly onto the lane marker so as to notify the driver of this condition.

Operation of system 10 may be supplemented by including a device which provides illumination for the imaging sensors in conditions of darkness. In the presently preferred embodiment, for example, at least one near IR emitter 40 is mounted on the vehicle so as to emit infra red light to aid one or more of sensors 20. Most CMOS cameras that are sensitive to visible light are also sensitive to near IR radiation. Human eyes, however, are not sensitive to near IR so this would provide assistance to system 10 in discerning objects while not interfering with drivers in front of the vehicle or drivers in oncoming vehicles.

While particular embodiments of the invention have been shown and described, numerous variations and alternate embodiments will occur to those skilled in the art. Accordingly, it is intended that the invention be limited only in terms of the appended claims.

What is claimed is:

1. An object detection and illumination system for a vehicle adapted to identify and illuminate an object so as to direct the attention of the driver of the vehicle to that object, said system comprising:

at least one sensor for collecting information about the surroundings of said vehicle;

an image processing system for receiving signals from said sensor and producing an output signal;

a light source drive system for receiving said output signal from said image processing system and for producing a light source control signal; and a light source being activated and positionally directed in accordance with said control signal.

2. The object illumination system of claim 1 wherein said sensor is of a type selected from the group of visible light, near infrared, far infrared and radar.

3. The object illumination system of claim 2 wherein said system comprises a plurality of said sensors.

4. The object illumination system of claim 3 wherein at least one said sensor senses brightness, said illumination system adapted to be turned off and on based on an output signal produced by said brightness sensor.

5. The object illumination system of claim 1 wherein said light source is a fiber optic light source.

6. The object illumination system of claim 1 wherein said processing system receives input signals from another electronic device on-board the vehicle, said device including one from the group of navigation system, braking system and cruise control system.

7. The object illumination system of claim 1 wherein said system further comprises a source of near infrared illumination.

8. An object detection and illumination system for a vehicle adapted to identify and illuminate an object so as to direct the attention of the driver of the vehicle to that object, said system comprising:

a plurality of sensors for collecting information about the surroundings of said vehicle;

an image processing system operably connected to said sensors, said image processing system adapted to receive data from said sensor, run image processing algorithms utilizing said data to identify said object, said image processing system further adapted to produce an output signal indicative of the location of said object;

a light source drive system for receiving said output signal from said image processing system and for producing a light source control signal; and a light source being activated and positionally directed in accordance with said control signal so as to direct illumination upon said object, as at least one of said vehicle and said object move with respect to the other.

9. The object illumination system of claim 8 further comprising a near infrared emitter.

10. A method for providing a system for identifying and controllably illuminating an object on or near the path in which a vehicle is traveling, said method comprising the steps of:

providing a sensor system on-board the vehicle;

coupling said sensor to an image processing system, said image processing system receiving data from said sensor and processing said data to identify said object;

providing a source of illumination; and controlling said source of illumination so as to direct light produced by said source onto said object.

11. The method of claim 10 further comprising the step of providing a source of near infrared illumination.

12. The method of claim 10 further comprising the step of coupling said system for identifying and controllably illuminating to at least one other on-board vehicle system including one of a navigation system, braking system and cruise control system.

13. The method of claim 10 further comprising the step of providing a brightness sensor and enabling said system for identifying and controllably illuminating based upon an input from said brightness sensor.

* * * * *